E. G. KLINE.
RIM CONSTRUCTION.
APPLICATION FILED FEB. 4, 1919.
1,329,976.
Patented Feb. 3, 1920.
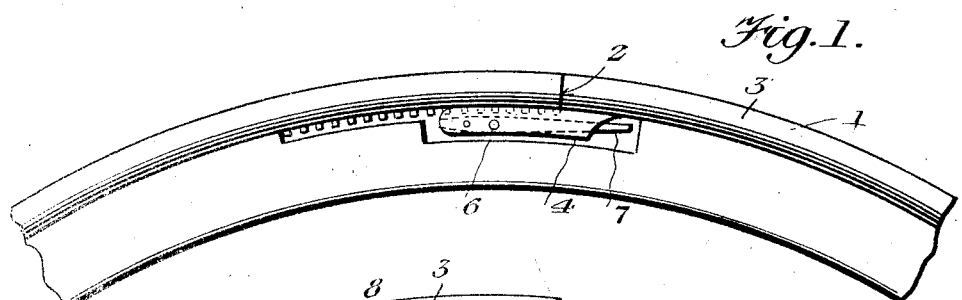
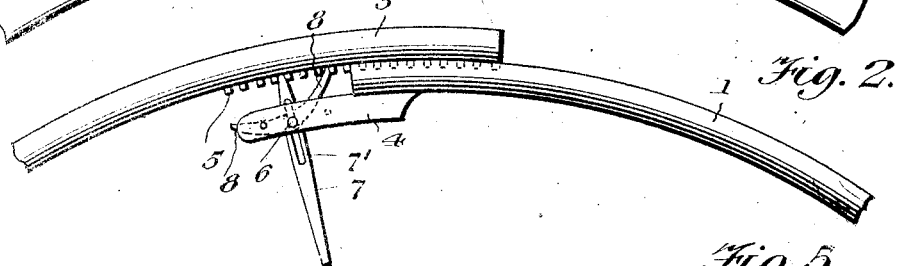
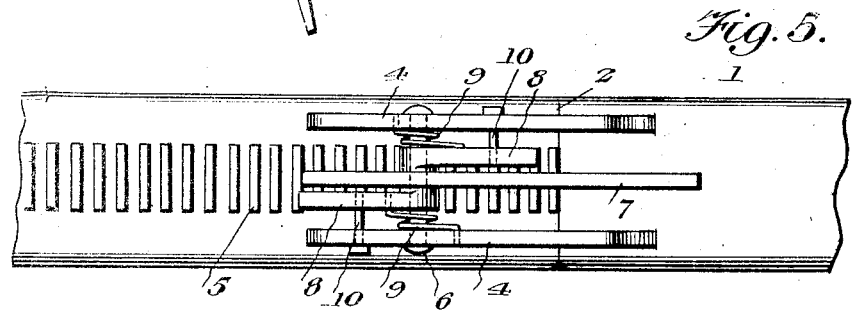
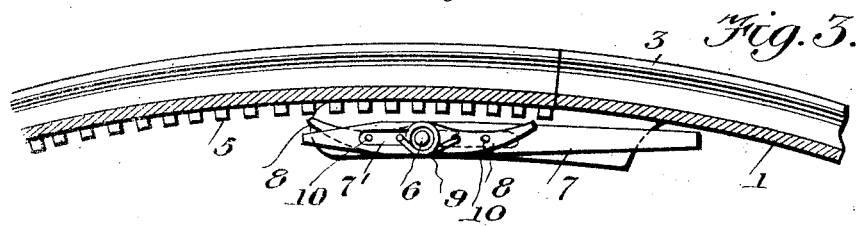
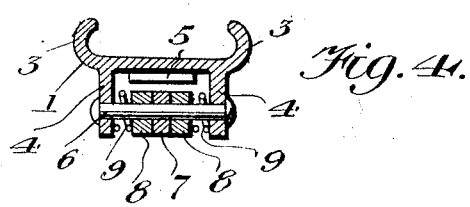
WITNESSES:
INVENTOR
*Ephraim G. Kline*
BY
*Victor J. Evans*
ATTORNEY

UNITED STATES PATENT OFFICE.

EPHRAIM G. KLINE, OF MILLERSTOWN, PENNSYLVANIA.

RIM CONSTRUCTION.

1,329,976.  Specification of Letters Patent.  Patented Feb. 3, 1920.

Application filed February 4, 1919. Serial No. 274,995.

*To all whom it may concern:*

Be it known that I, EPHRAIM G. KLINE, a citizen of the United States of America, residing at Millerstown, in the county of Perry and State of Pennsylvania, have invented new and useful Improvements in Rim Construction, of which the following is a specification.

This invention relates to improvements in rim construction and has particular application to a demountable tire carrying rim for use in connection with the wheels of motor vehicles.

In carrying out the present invention it is my purpose to provide a split rim wherein the ends of the rim may be quickly and conveniently brought into overlapping relation in order to contract the rim so that the tire may be removed therefrom and a new tire or shoe placed thereon and wherein the ends of the rim at the split may be easily and quickly moved to an abutting position in order to expand the rim so that the tire on the rim will be securely and effectively held thereon.

It is also my purpose to provide a rim structure of the character described wherein means for contracting and expanding the rim will embody comparatively few parts and being so arranged and correlated as to reduce the possibility of derangement to a minimum.

With the above recited objects in view and others of a similar nature the invention resides in the construction, combination and arrangement of parts set forth in and falling within the scope of the appended claims.

In the accompanying drawing:—

Figure 1 is a fragmentary side elevation of a rim constructed in accordance with my invention, the parts being shown in expanded position.

Fig. 2 is a similar view showing the parts in contracted position.

Fig. 3 is a fragmentary longitudinal sectional view through the rim.

Fig. 4 is a cross sectional view through the same.

Referring now to the drawing in detail 1 designates a rim split transversely as at 2 and having the split ends abutting each other in a normal or expanded condition of the rim so that the inner tube and the casing of the tire will be securely and effectively held upon the rim. In the present instance the side edges of the rim are provided with clencher flanges 3 and designed to engage the clencher beads on the tire tube or case to prevent accidental removal of the tire case from the rim.

In accordance with my present invention arms 4 are formed integral with the inner surface of the rim and one end of said rim and these arms project toward and under the outer end portion of the rim and spaced apart in parallelism as illustrated. Formed on the inner surface of the other end portion of the rim is a longitudinal row of teeth 5 arranged in line with the space between the arms 4. Passed through the outer ends of the arms 4 is a pin 6. 7 designates a lever formed, adjacent to one end, with a slot 7' through which the pin 6 passes in order to hold the lever fulcrumed between the outer ends of the arms 4. One end portion of the lever 7 is adapted to engage the teeth 5 while the other end portion of the lever is capable of being grasped by the hand so that the lever may be manipulated to expand and contract the rim. Also pivotally mounted upon the pin 6 at the opposite sides of the lever are holding dogs or pawls 8 each equipped with a spring 9 acting to hold the dog in active position, and formed with an opening adapted to aline with a similar opening in one of the arms 4 to receive a pin 10 whereby the particular dog may be held in inactive position against the action of the spring 9.

In practice, when the rim is in expanded condition the meeting ends thereof abut and the dogs 8—8 are held in a space between the arms 4 by means of the pin 10, while the lever 7 is swung to a position to lie within the plane of the arms 4. The arms and the lever are adapted to fit into a cut out recess in the felly of the wheel when the rim is placed on the wheel so that the rim may be effectively locked to the wheel to prevent accidental disconnection of the parts.

When it is desired to contract the rim, the dog 8 at the right hand side of the lever 7 in Fig. 2 of the drawing is relieved of the holding influence of its pin 10 so that the spring 9 may react to throw the dog to active position. The lever 7 is now swung to an angle of 90 degrees more or less, and this movement of the lever 7 in the tooth engaging end thereof engages the adjacent tooth 5 with effect to break the joint in the rim to pull the end bearing the arms 4 downwardly and on the inner side of the other end portion of the rim. Continued manipulation of the lever 7 throws the arm bearing portion of the rim farther into the circle depicted by the outer end portion of the rim thereby contracting the rim so that the tire tube and case or shoe may be conveniently removed from the rim. The active dog 8, during the manipulation of the lever 7, engages the teeth 5 to prevent retrograde motion of the rim thereby preventing accidental expansion of the rim.

To expand the rim, the formerly active dog 8 is swung to inactive position and held in such position by the pin 10, while the other dog is permitted to move to active position and the lever 7 manipulated in the reverse direction thereby expanding the rim.

While I have herein shown and described one particular form of my invention by way of illustration, I wish it to be understood that I do not limit or confine myself to the precise details of construction herein described and delineated, as modification and variation may be made within the scope of the claims without departing from the spirit of the invention.

I claim:—

1. In combination, a split rim, arms integral with one end of said rim at the inner sides thereof and projecting toward and under the other end, a lever fulcrumed between the outer ends of said arms and teeth formed on the inner surface of the other end portion of said rim and engageable with one end of said lever whereby in the manipulation of said lever the rim may be expanded and contracted, and means carried by said arms and engageable with said teeth to prevent reverse action of said rim in the manipulation of said lever.

2. In combination, a split rim, arms integral with one end of said rim at the inner sides thereof and projecting toward and under the other end, a lever fulcrumed between the outer ends of said arms and teeth formed on the inner surface of the other end portion of said rim and engageable with one end of said lever whereby in the manipulation of said lever the rim may be expanded and contracted, and a pin and slot connection between said lever and said arms to permit the manipulation of said lever.

In testimony whereof I affix my signature.

EPHRAIM G. KLINE.